United States Patent
Umezu et al.

(10) Patent No.: US 7,136,748 B2
(45) Date of Patent: Nov. 14, 2006

(54) MAP DATA PROCESSING APPARATUS AND CENTER SYSTEM

(75) Inventors: Masaharu Umezu, Tokyo (JP);
Tomoya Ikeuchi, Tokyo (JP); Makoto Mikuriya, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 327 days.

(21) Appl. No.: 10/751,409

(22) Filed: Jan. 6, 2004

(65) Prior Publication Data
US 2004/0135705 A1 Jul. 15, 2004

(30) Foreign Application Priority Data
Jan. 7, 2003 (JP) .............................. 2003-001085

(51) Int. Cl.
*G01C 21/30* (2006.01)
(52) U.S. Cl. ...................... 701/208; 701/211; 701/212; 340/995.1; 340/995.18
(58) Field of Classification Search ........ 701/200–201, 701/207–211, 23–25; 340/988–990, 995.1, 340/995.11, 995.12, 995.14, 995.18
See application file for complete search history.

(56) References Cited

U.S. PATENT DOCUMENTS

| | | | |
|---|---|---|---|
| 5,806,018 A | 9/1998 | Smith et al. ................. | 701/211 |
| 6,230,098 B1 * | 5/2001 | Ando et al. .................. | 701/208 |
| 6,453,233 B1 * | 9/2002 | Kato ........................... | 701/208 |
| 6,549,847 B1 | 4/2003 | Ikeuchi et al. ............... | 701/208 |
| 6,876,922 B1 * | 4/2005 | Nagaki ........................ | 701/208 |
| 2001/0025223 A1 | 9/2001 | Geiger et al. ............... | 701/211 |
| 2002/0082773 A1 * | 6/2002 | Ikeuchi et al. .............. | 701/211 |
| 2002/0091485 A1 | 7/2002 | Mikuriya et al. ........... | 701/208 |
| 2002/0165663 A1 | 11/2002 | Umezu et al. .............. | 701/210 |

FOREIGN PATENT DOCUMENTS

| | | |
|---|---|---|
| JP | 11-095657 A | 4/1999 |
| JP | 2002-207423 A | 7/2002 |

* cited by examiner

*Primary Examiner*—Gertrude A. Jeanglaude
(74) *Attorney, Agent, or Firm*—Birch, Stewart, Kolasch & Birch, LLP

(57) ABSTRACT

A map data processing apparatus includes: a map data storage unit, a differential data input unit, and a map data multiple update unit. The map data storage unit stores map data. The differential data input unit inputs differential data representing the difference between current map data stored in the map data storage unit and the most recent map data in a script format for each version. The map data multiple update unit updates the map data in the map data storage unit to the most recent map data using the differential data corresponding to the version.

8 Claims, 16 Drawing Sheets

MAP DATA PROCESSING APPARATUS AND CENTER SYSTEM

This Nonprovisional application claims priority under 35 U.S.C. § 119(a) on Patent Application No(s). 2003-001085 filed in JAPAN on Jan. 7, 2003, the entire contents of which are hereby incorporated by reference.

BACKGROUND OF THE INVENTION

1. Field of the Invention

The present invention relates to a map data processing apparatus for updating map data using the most recent map data and a center system for transferring data to and from the map data processing apparatus.

2. Background Art

In a vehicle-installed navigation system operating with map data or the like, hitherto, map data has been stored in a record medium such as a CD-ROM and has been updated to new map data by replacing the medium of the CD-ROM.

In this manner, however, the map data is updated about once or twice a year and is not necessarily updated to the most recent map data.

To overcome this problem, a system of using communication means to update map data in a shorter cycle is proposed. (For example, refer to JP-A-11-95657, page 6, FIG. 4) JP-A-11-95657 discloses an example wherein the difference from full update of a map database (map DB) is generated as differential data in an information center and is sent from the information center to a vehicle, which then performs update processing, thereby updating the map data to most recent map data. The differential data generation time period is taken short, whereby new information can be provided for the vehicle in real time.

However, in the example in the related art, to enable even the user who purchases a vehicle-installed navigation system at timing between the timing at which one new version of software for the vehicle-installed navigation system is put on the market and the timing at which a new version or a revision version of the software is put on the market to update map data to the most recent map, for example, one year is divided into three time periods (time period 1 (first time period), time period 2 (next time period), and time period 3 (last time period)) so that differential data 1 is sent in time period 1, differential data 1 and differential data 2 are sent in time period 2, and differential data 1, differential data 2, and differential data 3 are sent in time period 3. The differential data amount increases with the time period and to update the map data to the most recent map, map storage means of a large memory capacity becomes necessary; this is a problem. There is also a problem of an increase in the communication cost because the amount of the data to be transmitted increases.

These topics will be discussed with specific numeric values of the data amounts. For example, when a vehicle-installed navigation system is purchased, the map database stored in a CD-ROM, etc., is about 600 MB. In contrast, assuming that the above-mentioned time period is one year, the differential data for each time period becomes about 500 KB and in the related-art example, the differential data amount increases with the time period in such a manner that the differential data amount becomes 500 KB in time period 1, becomes 1 MB in time period 2, and becomes 1.5 MB in time period 3; this is a problem.

This is represented in terms of versions as follows: In the system in the related-art example, accumulation to the corresponding time period is applied and the differential data from version 1.0 to version 1.1 may be transmitted in time period 1; in addition to the differential data from version 1.0 to version 1.1, the differential data from version 1.1 to version 1.2 needs to be transmitted in time period 2, and the differential data from the differential data from version 1.0 to version 1.1 to the differential data from version 1.m (m=n−1) to version 1.n needs to be transmitted in time period n.

Particularly, unlike map data used in GIS, etc., navigation map data is in a format having little or no room for data update (data addition, change, deletion, etc.,) for lessening the data size; although one data update from the original data is possible, it is substantially impossible to furthermore update the post-update data. In the system in the related-art example, update must be performed using the update data in all time periods from the original data.

For example, it is also possible to upgrade application software to a later version every time period in a personal computer (PC). In this example, of a plurality of programs making up the software, a previous program is replaced with an update program; this basically differs from the operation of rewriting a part of the old data to perform data update as in the related-art example. In software of PC, the differential data amount to the most recent data varies from one time period to another and therefore the data amount increasing in the future is unpredictable in advance.

SUMMARY OF THE INVENTION

It is an object of the invention to provide a map data processing apparatus that can update map data in a small data amount by using the minimum differential data as the map data to update to the most recent map data in map data update processing.

To achieve the object, the invention provides a map data processing apparatus including: a map data storage unit configured to store map data; a differential data input unit configured to input differential data representing the difference between current map data stored in the map data storage unit and the most recent map data in a script format for each version; and a map data multiple update unit configured to update the map data in the map data storage unit to the most recent map data using the differential data corresponding to the version.

The invention provides a map data processing apparatus, including: a map data storage unit configured to store map data; a communication unit configured to transmit the version of the map data stored in the map data storage unit to an external system and to receive the corresponding differential data represented in a script format based on the version information; and a map data multiple update unit configured to update the map data in the map data storage unit to the most recent map data using the differential data.

The invention provides a center system, including: a communication unit configured to communicate with a map data processing apparatus; a differential data storage unit configured to store differential data represented in a script format for each version; and a transmission data determination unit configured to determine the differential data to be transmitted from the differential data storage unit to the map data processing apparatus based on version in formation received through the communication unit from the map data processing apparatus. The differential data determined by the transmission data determination unit is transmitted to the map data processing apparatus through the communication unit.

BRIEF DESCRIPTION OF THE DRAWINGS

The present invention may be more readily described with reference to the accompanying drawings, in which.

DETAILED DESCRIPTION OF THE PREFERRED EMBODIMENTS

Referring now to the accompanying drawings, there are shown embodiments in a map data processing apparatus and a center system according to the invention.

Figure 1:
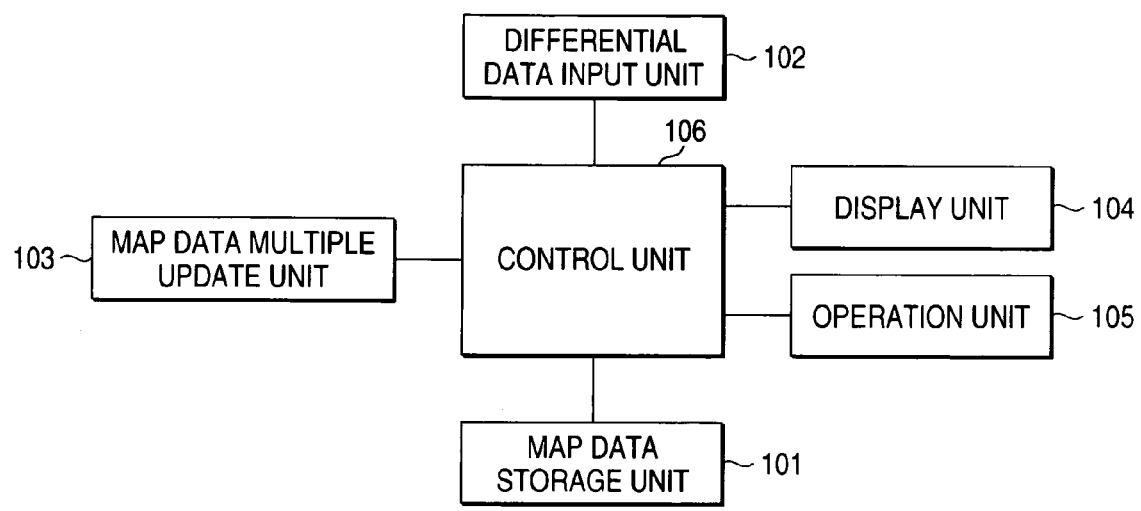
FIG. 1 is a block diagram to show the configuration of a map data processing apparatus of a first embodiment of the invention.

First Embodiment:

FIG. 1 is a block diagram to show the configuration of a map data processing apparatus of an embodiment according to a first aspect of the invention. The map data processing apparatus includes a map data storage unit 101 for storing map data, a differential data input unit 102 for inputting differential data representing the difference between the current map data and the most recent map data in a script format for each version, a map data multiple update unit 103 for updating the map data stored in the map data storage unit 101 to the most recent map data using the differential data corresponding to the version input through the differential data input unit 102, a display unit 104 for displaying based on the map data, etc., an operation unit 105 for the user to perform operation, and a control unit 106 for controlling read of map data from the map data storage unit 101, input of differential data from the differential data input unit 102, update to the most recent map data using the map data multiple update unit 103, map display on the display unit 104, and the like in response to operation of the operation unit 105, etc.

Figure 2:
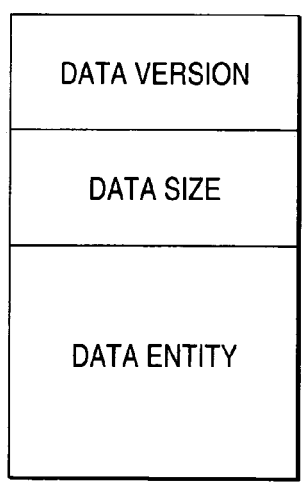
FIG. 2 is a drawing to show the format of map data stored in map data storage means in the first embodiment of the invention.

FIG. 2 shows the format of the map data stored in the map data storage unit 101. The map data has elements made up of a data entity used for map display, location, route searching, route guide, etc., and information of the data version and the data size of the map data.

Figure 3:
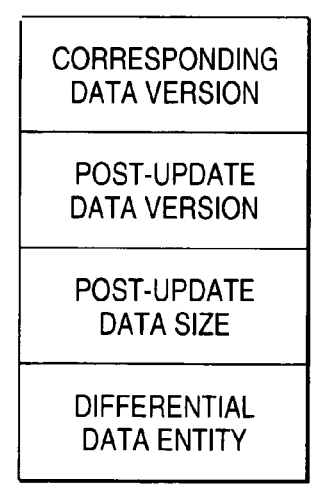
FIG. 3 is a drawing to show the format of differential data input through differential data input means in the first embodiment of the invention.

FIG. 3 shows the format of differential data input through the differential data input unit 102. The differential data is made up of a differential data entity indicating the differential data to update and information of the corresponding data version indicating the version of the map to be updated, the post-update data version of the version of the map after being updated, and the post-update data size of the size of the map data after being updated.

To perform data update using differential data of a plurality of versions in sequence, the differential data entity represents road addition, deletion, etc., for example, in a script format.

As the script format, description of data update is represented in the format of (operation description, operation target) or (operation description, operation target 1, operation target 2); the operation description includes addition, deletion, insertion, etc.

For example, to add road A, it is represented as (add, road A); to delete road B, it is represented as (delete, road B). To insert road E into the rear of road C, it is represented as (insert, road E, road C).

Figure 4:
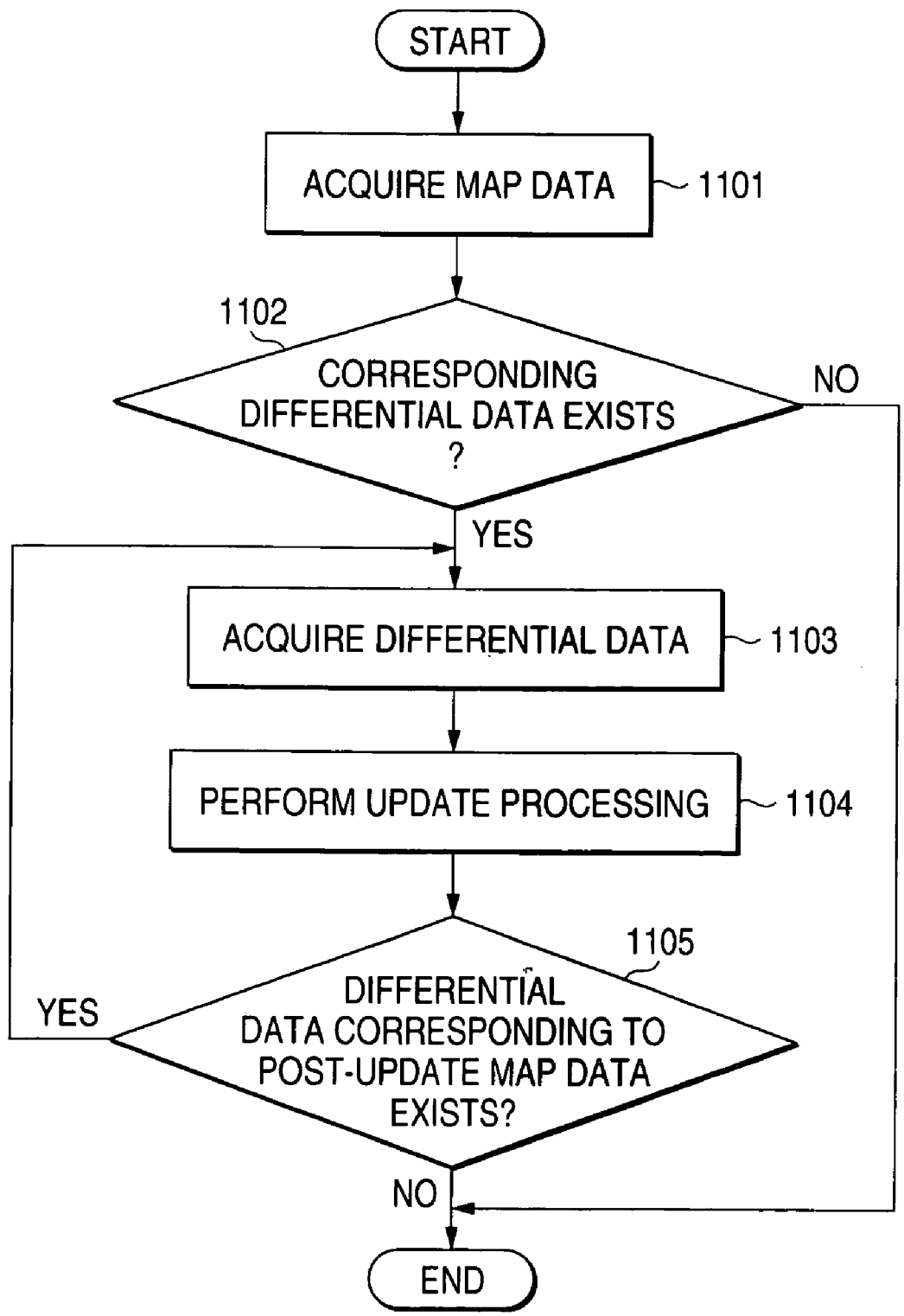
FIG. 4 is a flowchart to show the operation of the map data processing apparatus of the first embodiment of the invention.

FIG. 4 is a flowchart to show the operation of the map data processing apparatus of the embodiment.

Figure 5:
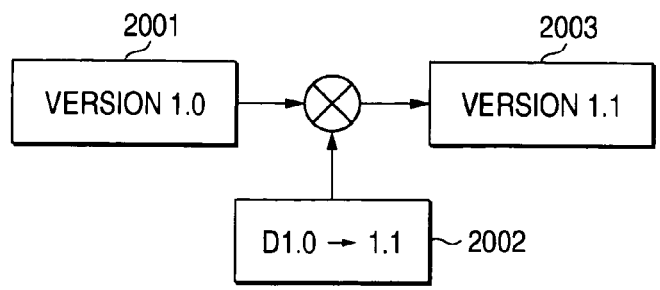
FIG. 5 is a schematic representation to show update processing in the first embodiment of the invention.

FIG. 5 is a schematic representation to show the operation of update processing in the embodiment. It shows map data 2001 in version 1.0 before updated, differential data 2002 to update the version from 1.0 to 1.1, and map data 2003 in version 1.1 after updated.

Figure 6:
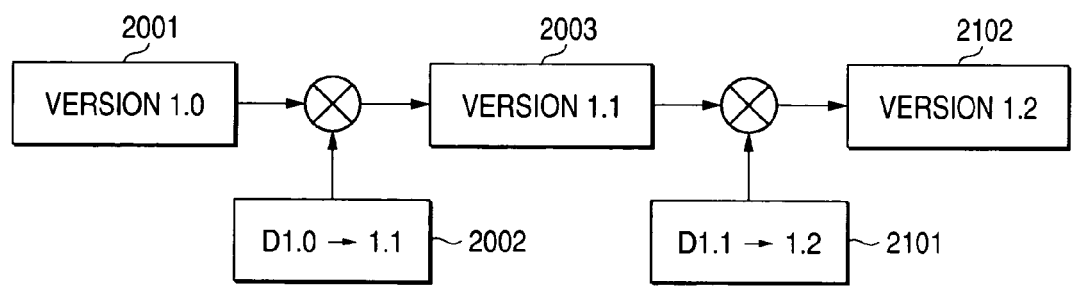
FIG. 6 is another schematic representation to show update processing in the first embodiment of the invention.

FIG. 6 is a schematic representation to show the operation of update processing in the embodiment, wherein differential data 2101 to update the version from 1.1 to 1.2 and map data 2102 in version 1.2 after updated are added to the data shown in FIG. 5.

Figure 7:
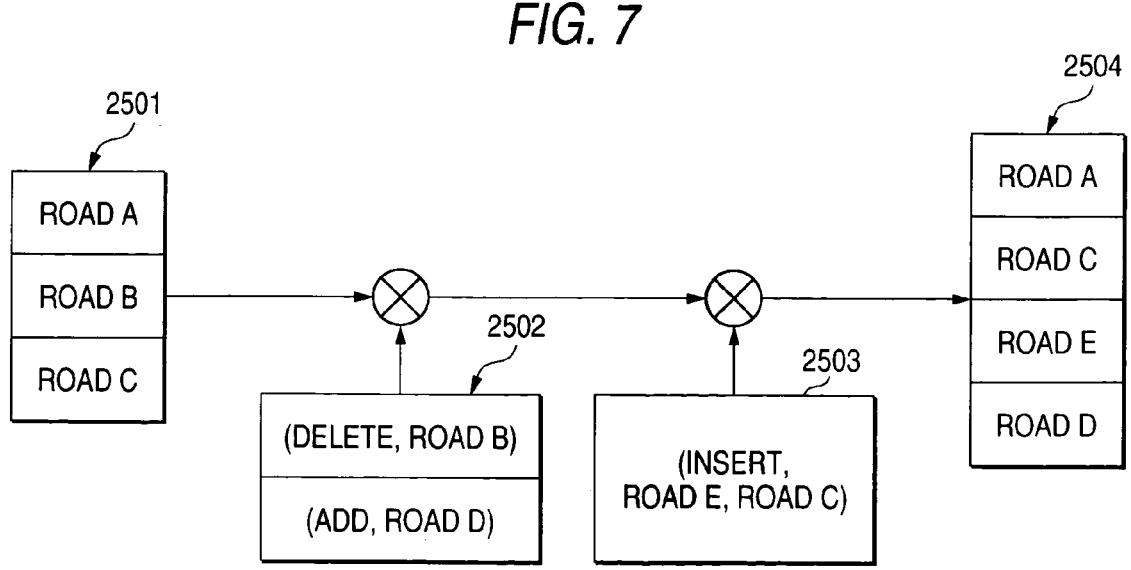
FIG. 7 is a drawing to show a specific example of the update processing in the first embodiment of the invention.

FIG. 7 shows a specific example of the update processing in the embodiment. It shows map data 2501 in version 1.0, differential data 2502 to update the version from 1.0 to 1.1, differential data 2503 to update the version from 1.1 to 1.2, and map data 2504 in version 1.2 after updated.

The alignment of the data from the top to the bottom of the map data 2501 and 2504 indicates the processing order when a map is drawn in order from the top. The data is overwritten in order from the top data for drawing. Accordingly, important data is stored at the bottom (for example, in the data 2504, ROAD D is important data), whereby it is made possible to display without embedding the important data in any other data.

The operation of the map data processing apparatus of the embodiment will be discussed with FIGS. 1 and 4 to 7. To begin with, map data is acquired from the map data storage unit 101 (step 1101) and whether or not differential data corresponding to the acquired map data exists is determined (step 1102). If the corresponding differential data does not exist, the update processing is terminated. If the corresponding differential data exists, the differential data is acquired (step 1103) and update processing is performed (step 1104). Next, whether or not differential data corresponding to the map data after updated exists is determined (step 1105). If the corresponding differential data does not exist, the update processing is terminated. If the corresponding differential data exists, the processing starting at step 1103 is repeated. Accordingly, the update processing is performed (step 1104) using all corresponding differential data.

For example, FIG. 5 shows the operation in the case where one corresponding differential data exists, wherein the map data is updated from version 1.0 to version 1.1.

FIG. 6 shows the operation in the case where two pieces of corresponding differential data exist, wherein the map data is once updated from version 1.0 to version 1.1 and then to version 1.2. Here, version 1.1 is earlier than version 1.2; the map data is updated in order from the earlier version to the later version.

In FIG. 7, the differential data 2502 from version 1.0 to version 1.1 is (DELETE, ROAD B), (ADD, ROAD D), the differential data 2503 from version 1.1 to version 1.2 is (INSERT, ROAD E, ROAD C), and the map data 2504 in version 1.2 has (DELETE, ROAD B), (ADD, ROAD D), (INSERT, ROAD E, ROAD C) reflected on the map data 2501 in version 1.0.

The embodiment has been described by taking the update operation from version 1.0 to version 1.2 as an example; however, if the version of the map data in the map data processing apparatus is 1.1, only the differential data from version 1.1 to version 1.2 is used to update the map data; the map data is updated to version 1.2.

Likewise, adding update from version 1.m (m=n−1) to 1.n, the differential data in the corresponding time period (for example, the differential data from version 1.0 to version 1.1 in time period 1; the differential data from version 1.1 to version 1.2 in time period 2; the differential data from version 1.m (m=n−1) to version 1.n in time period n) maybe transmitted.

That is, the map data processing apparatus installed in the vehicle receives differential data every time period and updates the map data to the most recent map data each time. At this time, the differential data amount for each time period is mostly proportional to the number of roads newly opened within the time period and if the length of each time period is constant, the differential data amount for each time period becomes almost constant.

As described above, in the system of the embodiment, to perform data update, the differential data in the script format is used and the map data made up of a plurality of elements is used, so that once updated data can also be further more updated. Thus, the differential data amount becomes almost constant although the time period proceeds; the differential data amount becomes almost a half in time period 2 and becomes almost one-nth in time period n as compared with the system in the related art. The necessary memory capacity of the map data storage unit may be the memory capacity in the first time period and the memory capacity need not be increased although the time elapses. That is, if the version of the map data proceeds, update to the most recent map can be performed with small-capacity memory. Since the amount of the data to be transmitted is small, the communication time can be shortened, so that the communication cost can also be reduced.

Figure 8:
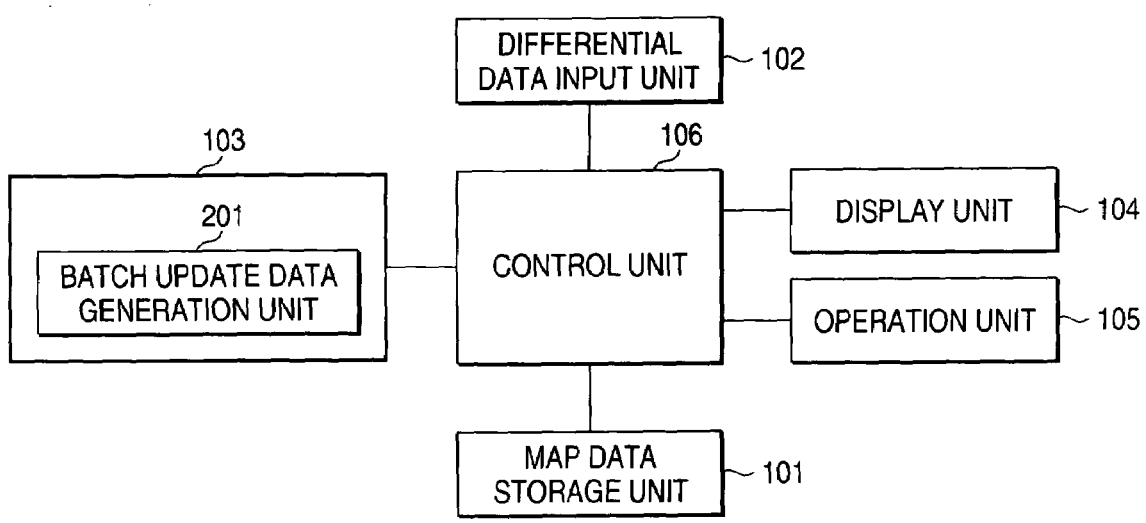
FIG. 8 is a block diagram to show the configuration of a map data processing apparatus of a second embodiment of the invention.

Second Embodiment:

FIG. 8 is a block diagram to show the configuration of a map data processing apparatus of an embodiment according to a second aspect of the invention. A batch updated at a generation unit 201 for generating batch update data from at least one differential data is contained in the map data multiple update unit 103 shown in FIG. 1.

Figure 9:
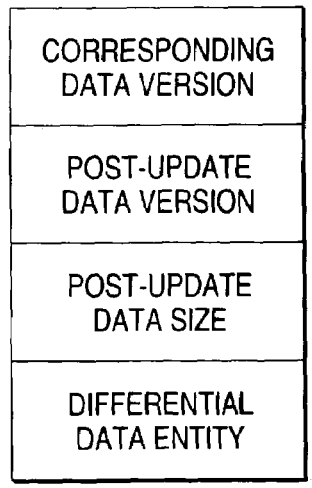
FIG. 9 is a drawing to show the format of batch update data in the second embodiment of the invention.

FIG. 9 shows the format of the batch update data. Here, the format of the batch update data is the same as that of the differential data.

The formats of the differential data and the batch update data are made the same, whereby update processing with the differential data and that with the batch update data are made the same and an increase in the program size is suppressed.

Figure 10:
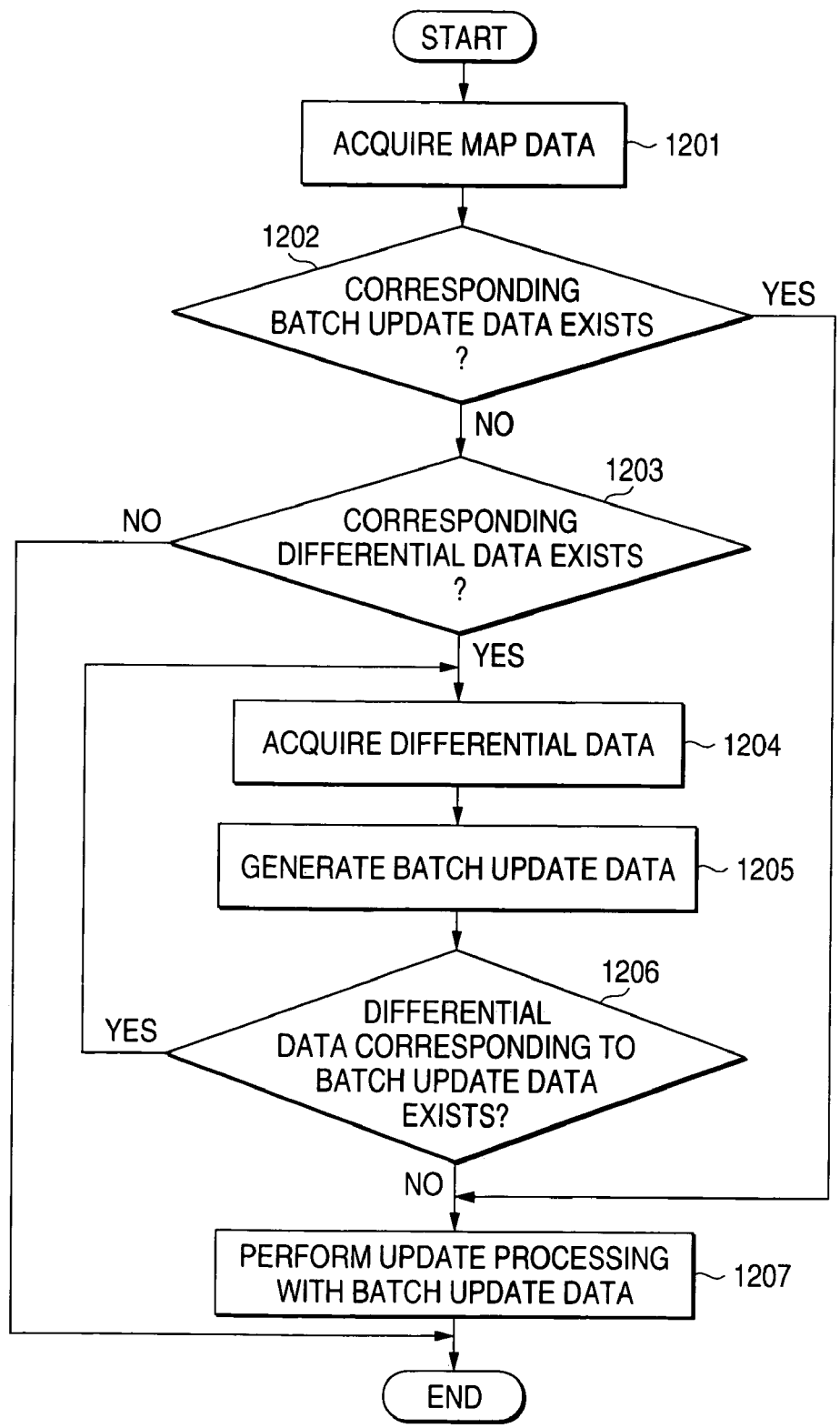
FIG. 10 is a flowchart to show the operation of the map data processing apparatus of the second embodiment of the invention.
Figure 11:
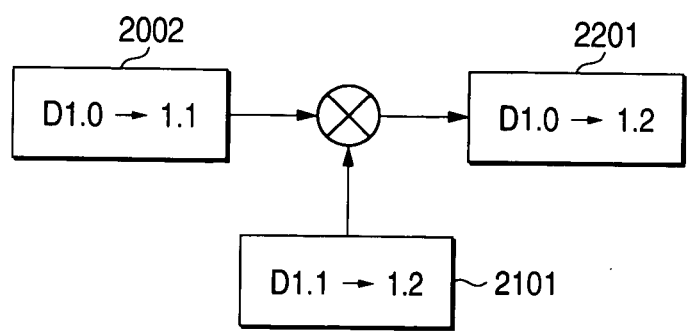
FIG. 11 is a schematic representation to show the operation of batch update data generation in the second embodiment of the invention.
Figure 12:
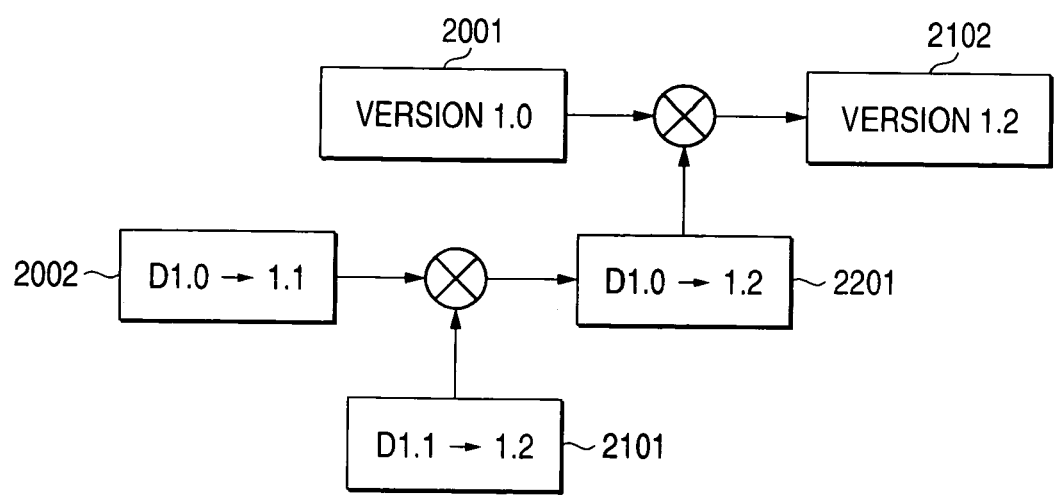
FIG. 12 is a schematic representation to show the operation of map data update in the second embodiment of the invention.

FIG. 10 is a flowchart to show the operation of the map data processing apparatus of the embodiment. FIG. 11 is a schematic representation to show the operation of batch update data generation in the embodiment, wherein batch update data 2201 generated from differential data is batch update data from version 1.0 to 1.2. FIG. 12 is a schematic representation to show the operation of map data update in the embodiment.

Figure 13:
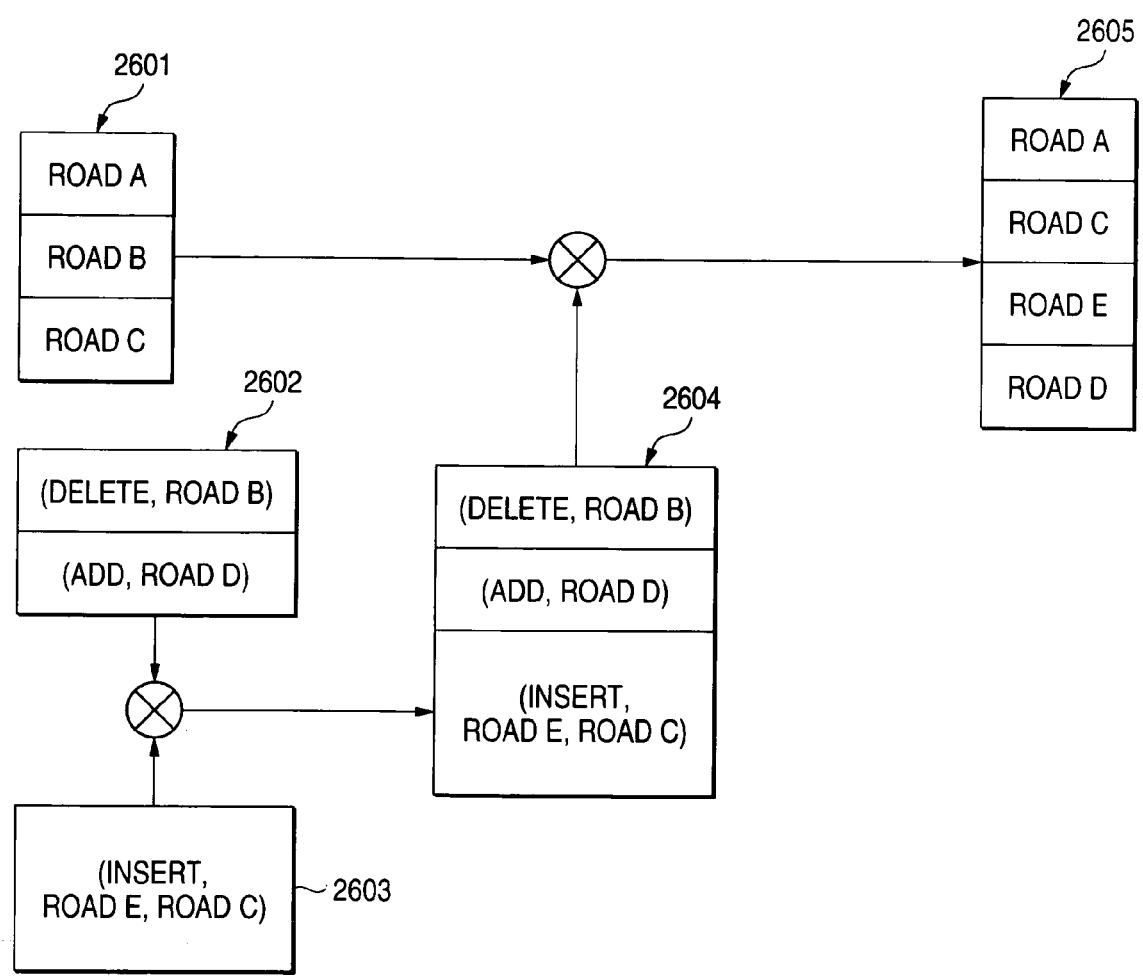
FIG. 13 is a drawing to show a specific example of the map data update operation in the second embodiment of the invention.

FIG. 13 shows a specific example of update processing in the embodiment. It shows map data 2601 in version 1.0, differential data 2602 to update from version 1.0 to version 1.1, differential data 2603 to update from version 1.1 to version 1.2, batch update data 2604 to update from version 1.0 to version 1.2, and map data 2605 in version 1.2 after updated.

The operation of the map data processing apparatus of the embodiment will be discussed with FIGS. 8 and 10 to 13. To begin with, map data is acquired from map data storage unit 101 (step 1201) and whether or not batch update data corresponding to the acquired map data exists is determined (step 1202). If the corresponding batch update data exists, update processing with the batch update data is performed (step 1207). If the corresponding batch update data does not exist, whether or not differential data corresponding to the acquired map data exists is determined (step 1203). If the corresponding differential data does not exist, the update processing is terminated. If the corresponding differential data exists, the differential data is acquired (step 1204) and batch update data is generated (step 1205). Next, whether or not differential data corresponding to the generated batch update data exists is determined (step 1206). If the corresponding differential data does not exist, update processing with the batch update data is performed (step 1207). If the corresponding differential data exists, the processing starting at step 1204 is repeated. Accordingly, batch update data is generated from all corresponding differential data (step 1205) and the update processing is performed using generated batch update data (step 1207).

For example, FIG. 11 shows the operation of batch update data generation in the case where two pieces of corresponding differential data exist, wherein the batch update data 2201 for updating from version 1.0 to version 1.2 is generated from differential data 2002 from version 1.0 to 1.1 and differential data 2101 from version 1.1 to version 1.2.

FIG. 12 shows the operation of map update using the batch update data generated in FIG. 11. It indicates that the map data can be updated from version 1.0 directly to version 1.2 not via version 1.1.

In FIG. 13, the differential data 2602 from version 1.0 to version 1.1 is (DELETE, ROAD B), (ADD, ROAD D), the differential data 2603 from version 1.1 to version 1.2 is (INSERT, ROAD E, ROAD C), and the batch update data 2604 becomes (DELETE, ROAD B), (ADD, ROAD D), (INSERT, ROAD E, ROAD C).

As the map data size, the differential data is smaller than the usual map data; for example, assuming that the usual map data is about 500 KB, the size of the map data of the differential data becomes 10 KB or less. The size of batch update data results from adding the size for storing information of the corresponding data version, the post-updated at a version, and the post-update data size to the sum total of the sizes of all differential data entities. Accordingly, although it is necessary to reserve memory of about 1 MB for two pieces of map data to update twice in the first embodiment, memory of about 520 KB may be reserved for one map data and the batch update data in the second embodiment; it is made possible to operate in a smaller memory capacity and update to the most recent map can be accomplished at high speed.

Figure 14:
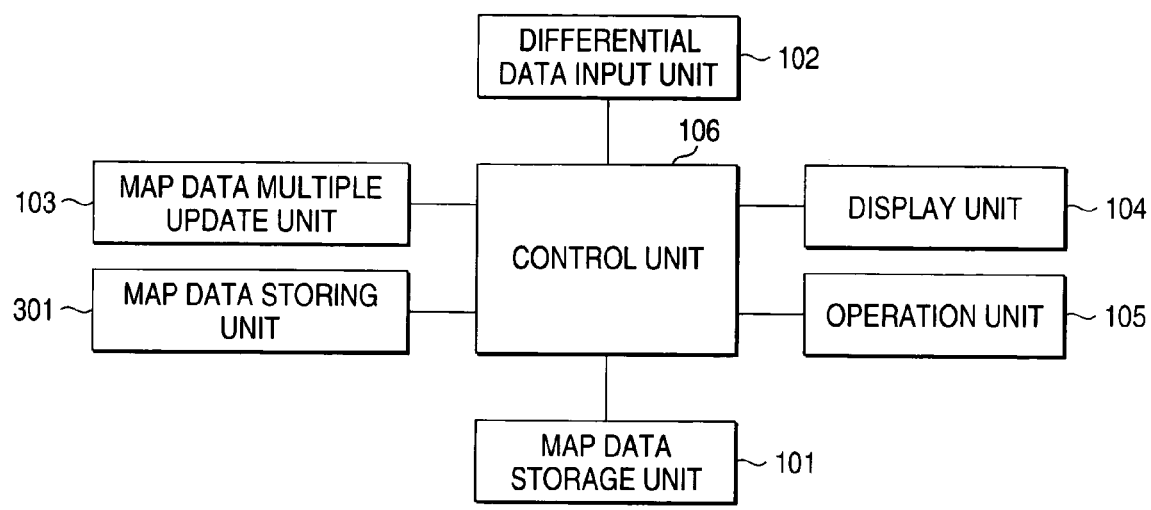
FIG. 14 is a block diagram to show the configuration of a map data processing apparatus of a third embodiment of the invention.

Third Embodiment:

FIG. 14 is a block diagram to show the configuration of a map data processing apparatus in an embodiment according to a third aspect of the invention. The map data processing apparatus is provided by adding a map data storing unit 301 of a rewritable storage unit such as flash RAM, a hard disk unit, or a DVD-RAM for storing already updated map data to the map data processing apparatus shown in FIG. 1.

Figure 15:
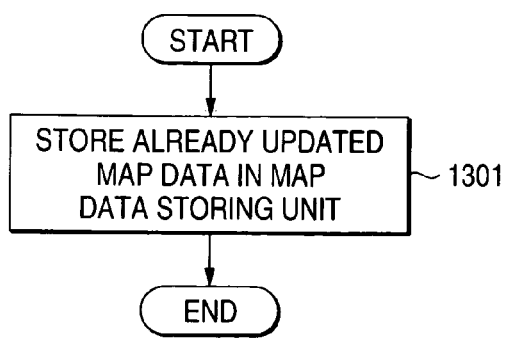
FIG. 15 is a flowchart to show the operation of storing already updated map data in the third embodiment of the invention.

FIG. 15 is a flowchart to show the operation of storing already updated map data in the embodiment.

The operation of the map data processing apparatus of the embodiment will be briefly discussed with FIGS. 4, 14, and 15.

Map data updated by performing the processing previously described with reference to FIG. 4 is stored in the map data storing unit 301 shown in FIG. 14 by performing the map data storing operation shown in FIG. 15 (step 1301).

According to the third embodiment, the updated map data is additionally stored in the map data storing unit, whereby the once updated map data can be used without being updated in the next processing or later.

Figure 16:
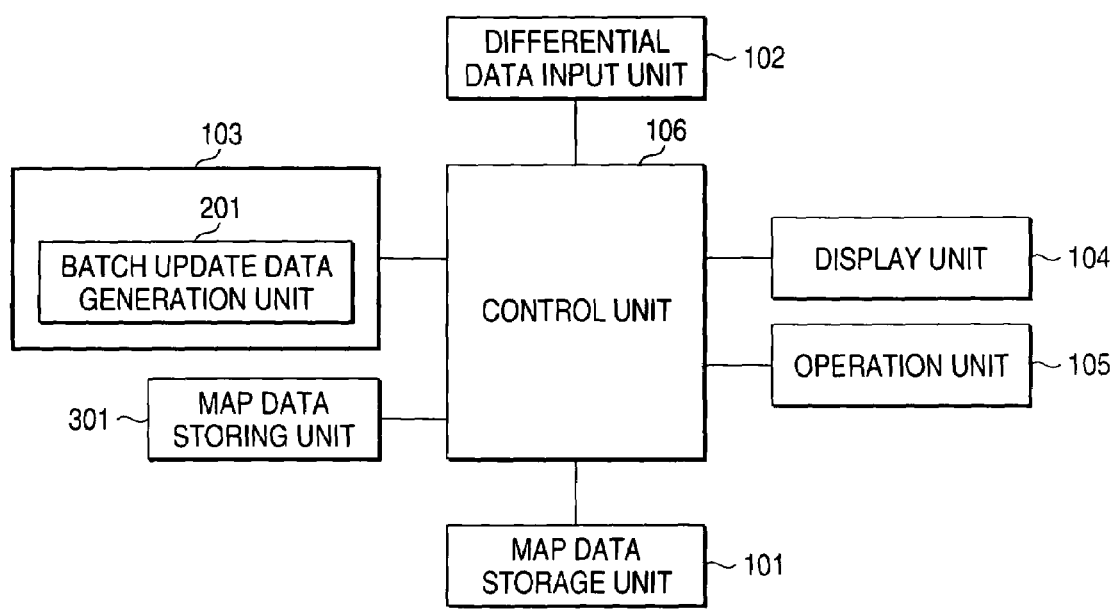
FIG. 16 is a block diagram to show the configuration of a map data processing apparatus of a fourth embodiment of the invention.

Fourth Embodiment:

FIG. 16 is a block diagram to show the configuration of a map data processing apparatus in another embodiment according to the third aspect of the invention. The map data processing apparatus is provided by adding a map data storing unit 301 to the configuration previously described with reference to FIG. 8.

The operation of storing map data is the same as that in the third embodiment. Map data updated by performing the processing previously described with reference to FIG. 10 is stored in the map data storing unit 301 shown in FIG. 16 by performing the map data storing operation shown in FIG. 15 (step 1301).

According to the fourth embodiment, the map data updated at high speed is additionally stored in the map data storing unit, whereby the once updated map data can be used without being updated in the next processing or later.

Figure 17:
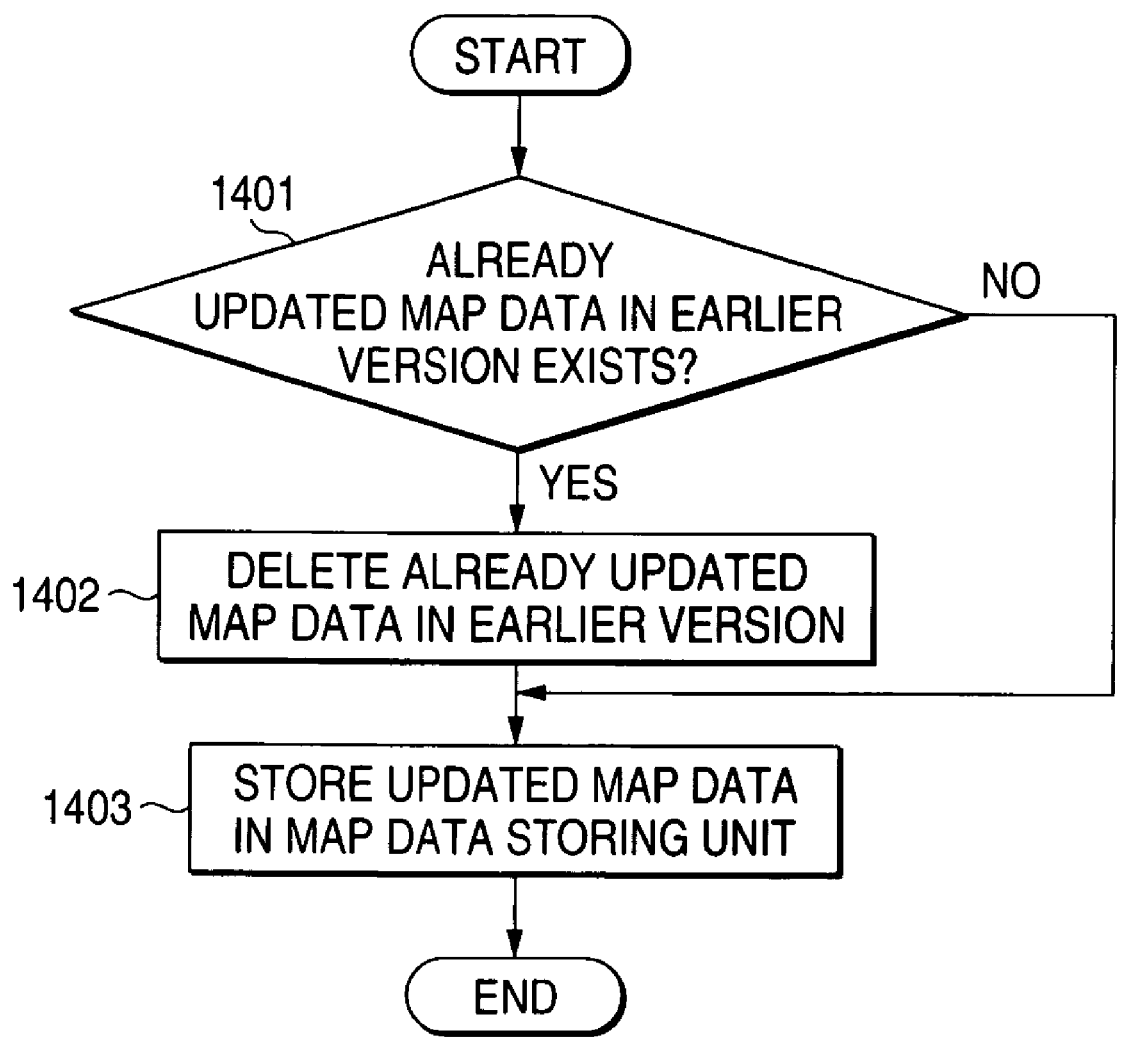
FIG. 17 is a flowchart to show the operation of storing already updated map data in a fifth embodiment of the invention.

Fifth Embodiment:

FIG. 17 is a flowchart to show the operation of storing already updated map data in an embodiment according to a fourth aspect of the invention. The configuration of a map data processing apparatus of the embodiment is that shown in FIG. 14 or 16.

The operation of the map data processing apparatus of the embodiment will be discussed with FIGS. 4, 10, and 17. After the map data is updated by performing the processing previously described with reference to FIG. 4 or 10, whether or not already updated data in the earlier version is stored in map data storing unit 301 is checked (step 1401). If already updated data in the earlier version is stored, the map data is deleted from the map data storing unit 301 (step 1402). Next, the updated map data is stored in the map data storing unit shown in FIG. 14 or 16 (step 1403).

According to the fifth embodiment, the data stored in the map data storing unit is overwritten with the updated map data, whereby only the most recent map data can be left and the capacity of memory to store the map data can be reduced.

Figure 18:
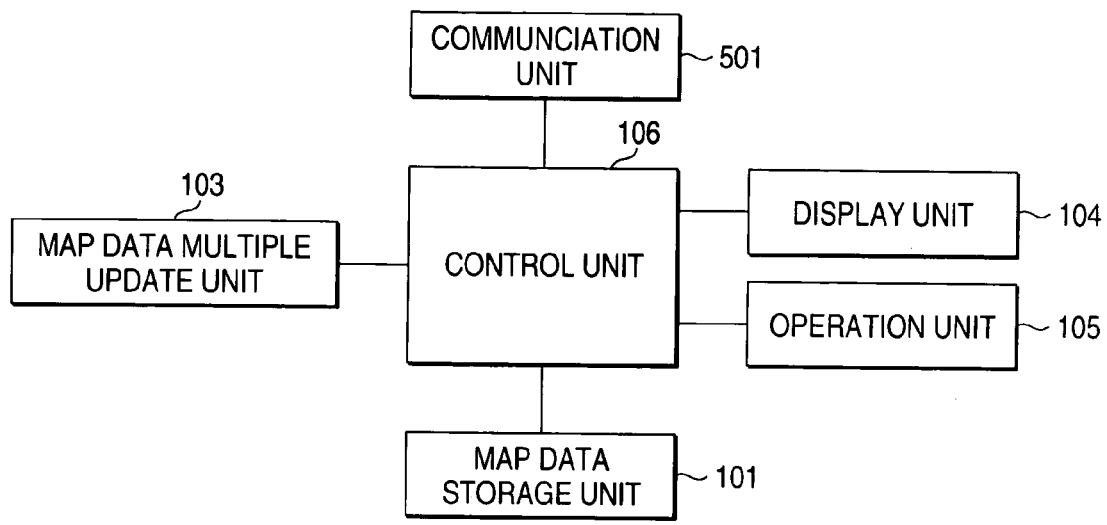
FIG. 18 is a block diagram to show the configuration of a map data processing apparatus of a sixth embodiment of the invention.

Sixth Embodiment:

FIG. 18 is a block diagram to show the configuration of a map data processing apparatus in an embodiment according to a fifth aspect of the invention. The map data processing apparatus includes a communication unit 501 for communicating with an external system such as a map center system for transmitting a map version and receiving differential data represented in a script format corresponding to the version in place of the differential data input unit shown in FIG. 1.

Figure 19:
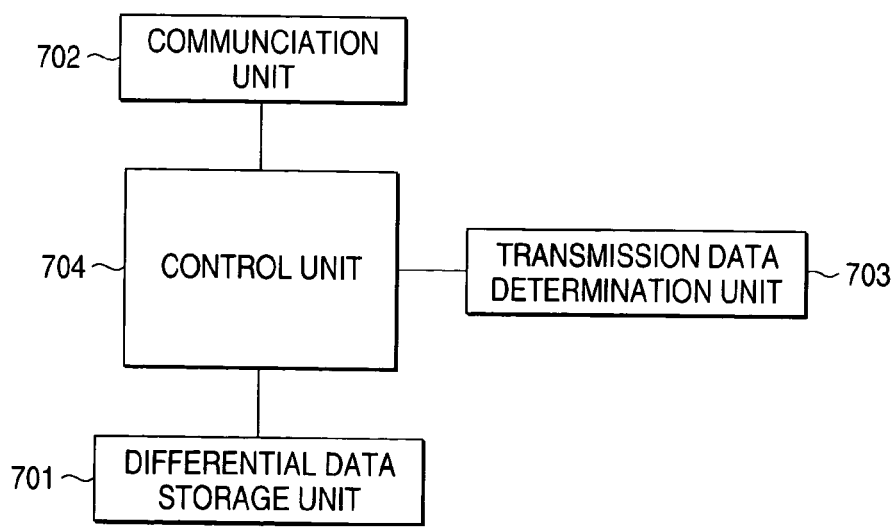
FIG. 19 is a block diagram to show the configuration of a center system for communicating with the map data processing apparatus in the sixth embodiment of the invention.

FIG. 19 is a block diagram to show the configuration of a center system for communicating with the map data processing apparatus shown in FIG. 18 and transmitting differential data. The center system is made up of a differential data storage unit 701 for storing differential data for each version, a communication unit 702 for communicating with the map data processing apparatus for receiving version information and transmitting differential data represented in the script format corresponding to the version, a transmission data determination unit 703 for determining the differential data to be transmitted from the center system to the map data processing apparatus based on map version information received through the communication unit 702 from the map data processing apparatus, and a control unit 704 for controlling read of the differential data from the differential data storage unit 701, reception of the map version and transmission of the differential data using the communication unit 702, determination of the differential data to be transmitted using the transmission data determination unit 703, and the like.

Figure 20:
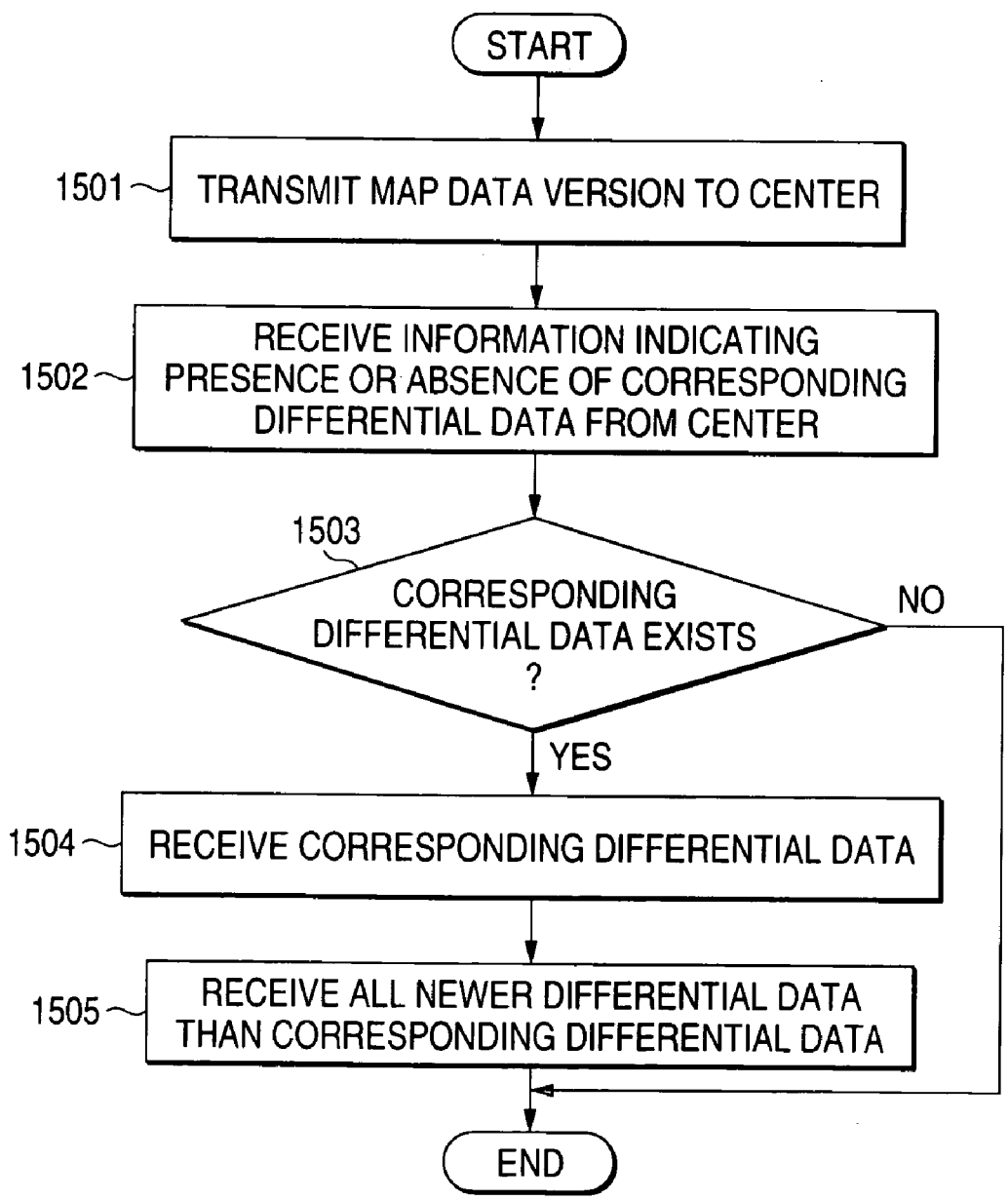
FIG. 20 is a flowchart to show the differential data reception operation of the map data processing apparatus in the sixth embodiment of the invention.

FIG. 20 is a flowchart to show the differential data reception operation of the map data processing apparatus shown in FIG. 18.

Figure 21:
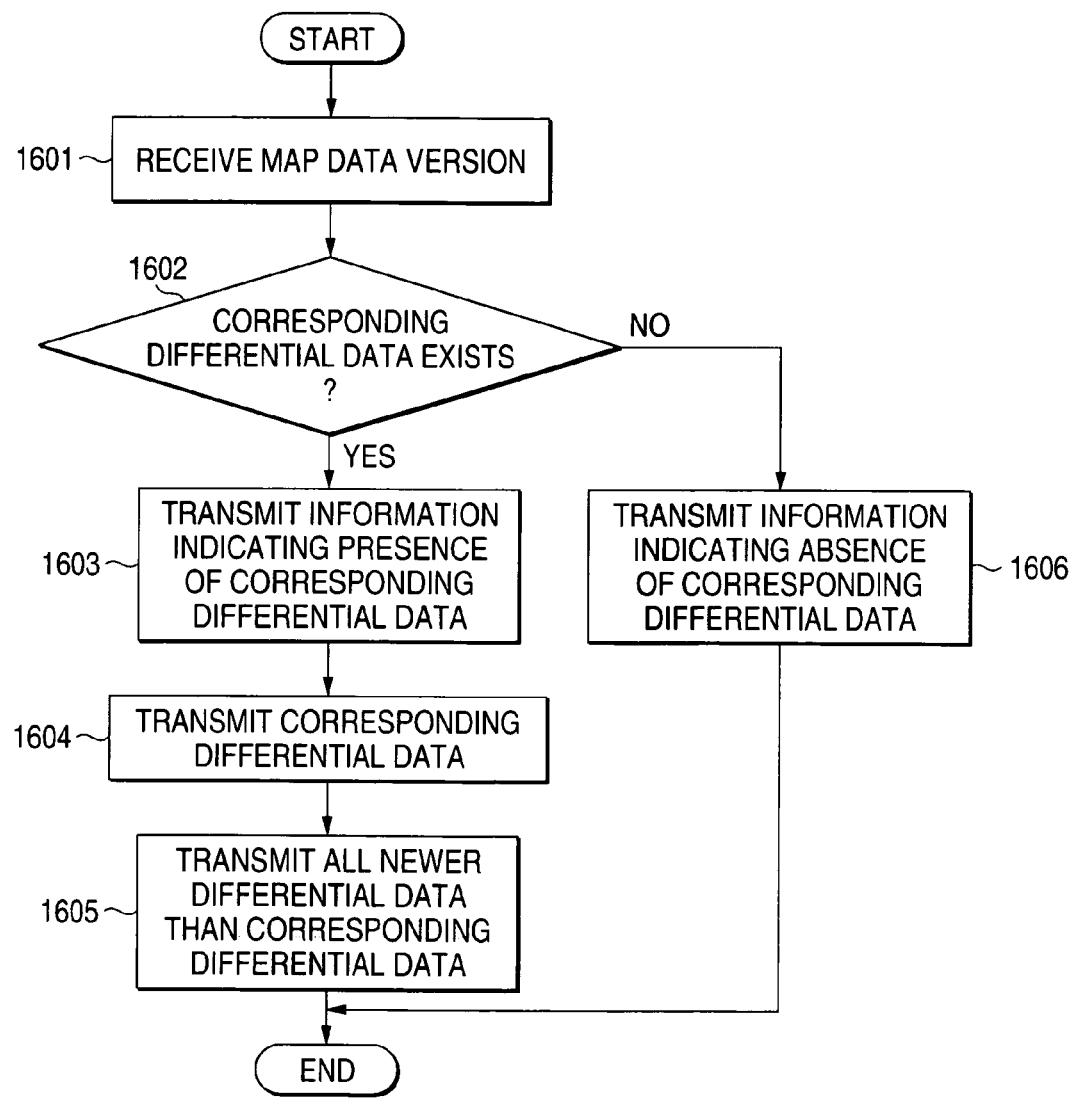
FIG. 21 is a flowchart to show the operation of the center system corresponding to the operation in FIG. 20 in the sixth embodiment of the invention.

FIG. 21 is a flowchart to show the operation of the center system corresponding to the operation in FIG. 20. The differential data reception operation of the map data processing apparatus will be discussed with FIGS. 18 to 21.

Map data version is transmitted to an external system such as a map center using the communication unit 501 (step 1501) and then information indicating the presence or absence of the corresponding differential data is received from the external system such as the map center (step 1502). Subsequently, whether or not the differential data exists is determined (step 1503). If the differential data does not exist, the processing is terminated. If the differential data exists, the corresponding differential data is received from the external system (step 1504) and further all newer differential data than the corresponding differential data is received (step 1505).

For example, if the map data version in the map data processing apparatus is 1.1 and the differential data in the external system includes the three types of differential data from 1.0 to 1.1, from 1.1 to 1.2, and from 1.2 to 1.3, first the differential data corresponding to the map data, namely, the differential data from 1.1 to 1.2 is received and then new differential data, namely, the differential data from 1.2 to 1.3 is received.

Next, the operation of the center system corresponding to the operation of the map data processing apparatus will be discussed with FIGS. 19 and 21.

The map data version is received from the map data processing apparatus using the communication unit 702 (step 1601) and whether or not the differential data corresponding to the version exists is determined in the transmission data determination unit 703 (step 1602). If the corresponding differential data does not exist, information indicating that the corresponding differential data does not exist is transmitted to the map data processing apparatus (step 1606) and the processing is terminated. If the corresponding differential data exists, information indicating that the corresponding differential data exists is transmitted to the map data processing apparatus (step 1603). Then, the differential data corresponding to the version is taken out from the differential data storage unit 701 and is transmitted (step 1604) and further all differential data in the later versions than the corresponding differential data is transmitted (step 1605).

According to the sixth embodiment, the version information of the held map data is transmitted to the map center system and the differential data corresponding to at least one version is received, so that the differential data amount required for update does not increase if the map data version proceeds.

In the described embodiment, the map data version is sent from the map data processing apparatus to an external system such as a map center and the center system determines the differential data to be transmitted. However, similar advantages are provided if the map data processing apparatus first determines the version of the differential data held by the center system and then requests the external system such as the center system to send the corresponding differential data and receives the corresponding differential data from the external system. The external system is not limited to the center system if it can transmit and receive the map data corresponding to the version.

Figure 22:
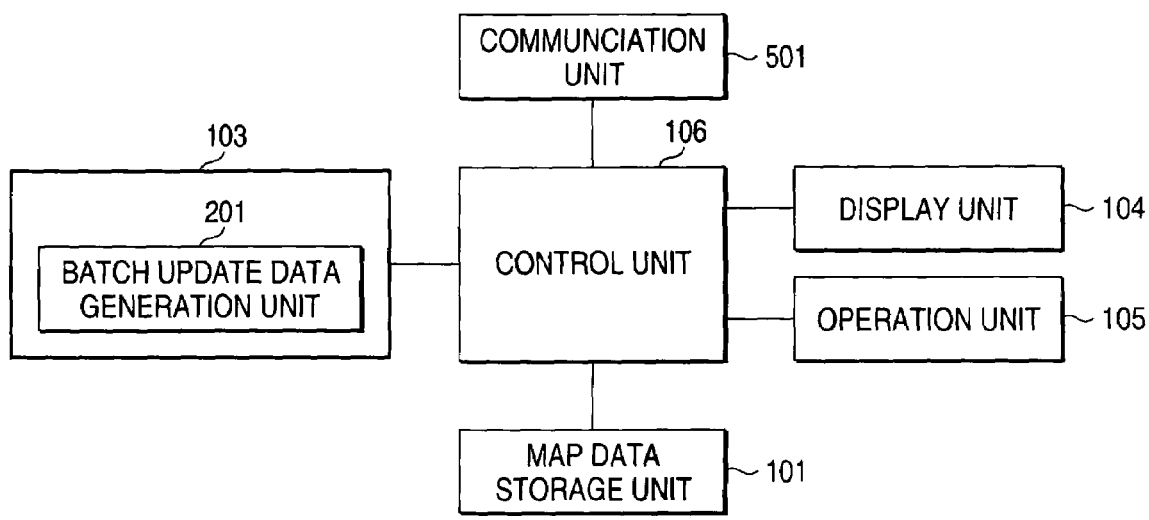
FIG. 22 is a block diagram to show the configuration of a map data processing apparatus of a seventh embodiment of the invention.

Seventh Embodiment:

FIG. 22 is a block diagram to show the configuration of a map data processing apparatus of another embodiment according to the fifth aspect of the invention. The map data processing apparatus has a communication unit 501 for communicating with a center system for transmitting a map version and receiving differential data corresponding to the version in place of the differential data input unit 102 shown in FIG. 8. The operation of the map data processing apparatus is similar to that of the map data processing apparatus of the sixth embodiment and therefore will not be discussed again in detail.

According to the seventh embodiment, the version information of the held map data is transmitted to the center system and the differential data corresponding to at least one version containing the most recent version is received, so that the differential data amount required for update does not increase if the map data version proceeds.

Figure 23:
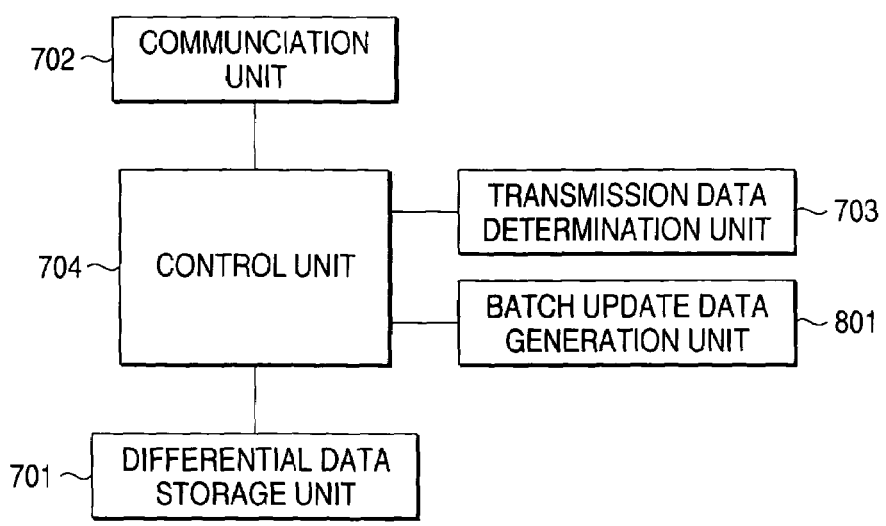
FIG. 23 is a block diagram to show the configuration of a center system in an eighth embodiment of the invention.

Eighth Embodiment:

FIG. 23 is a block diagram to show the configuration of a center system in an embodiment according to an eighth aspect of the invention. The center system is provided by adding a batch update data generation unit 801 for generating batch update data from at least one differential data to the configuration previously described with reference to FIG. 19.

The configuration of a map data processing apparatus in the eighth embodiment is that shown in FIG. 18 or 22.

Figure 24:
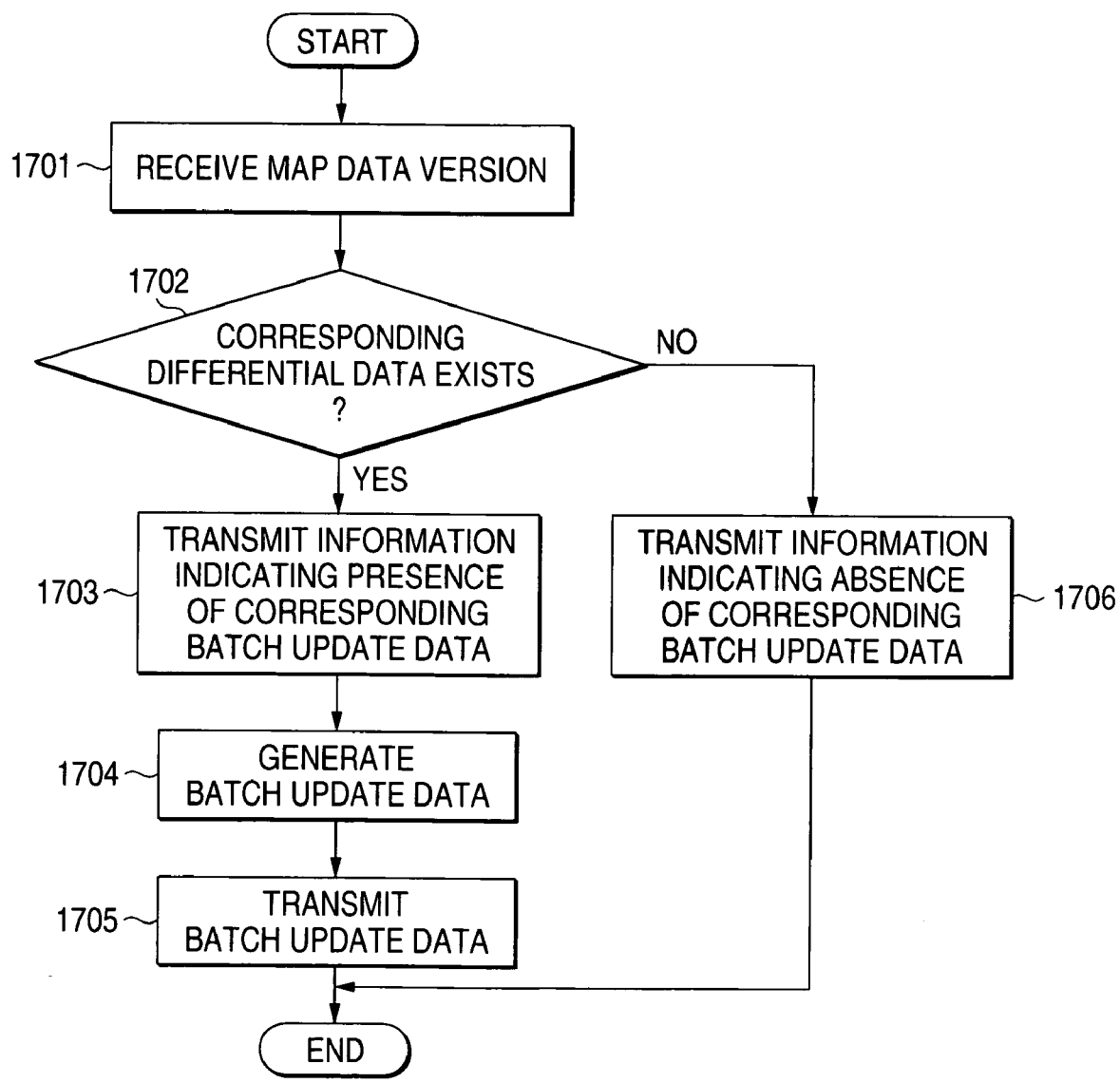
FIG. 24 is a flowchart to show the batch update data transmission operation of the center system in the eighth embodiment of the invention.
Figure 25:
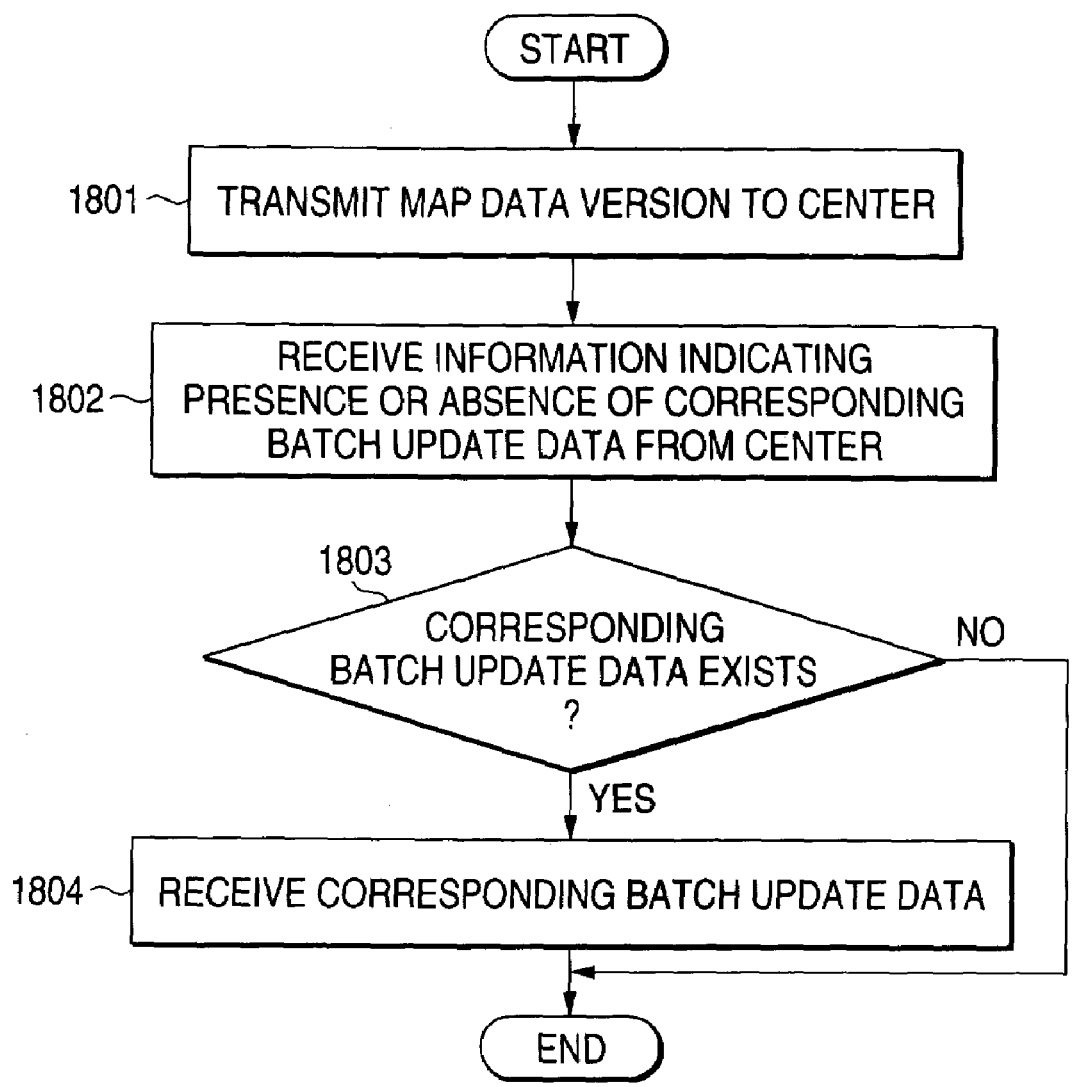
FIG. 25 is a flowchart to show the operation of a map data processing apparatus in the eighth embodiment of the invention.

FIG. 24 is a flowchart to show the batch update data transmission operation of the center system in the embodiment. FIG. 25 is a flowchart to show the operation of the map data processing apparatus.

Next, the batch update data transmission operation of the center system will be discussed with FIGS. 23 and 24. Map data version is received from the map data processing apparatus using communication unit 702 (step 1701) and whether or not the differential data corresponding to the version exists is determined in transmission data determination unit 703 (step 1702). If the corresponding differential data does not exist, information indicating that the corresponding differential data does not exist is transmitted to the map data processing apparatus (step 1706) and the processing is terminated. If the corresponding differential data exists, information indicating that the corresponding differential data exists is transmitted to the map data processing apparatus (step 1703). Then, the differential data corresponding to the version and all differential data newer than the corresponding differential data are taken out from differential data storage unit 701 and batch update data is generated (step 1704) and is transmitted to the map data processing apparatus (step 1705). Generating the batch update data (step 1704) is the same processing as the batch update data generation processing shown in FIG. 11.

Next, the operation of the map data processing apparatus corresponding to the operation of the center system will be discussed with FIGS. 22 and 25. Map data version is transmitted to the center system using communication unit 501 (step 1801) and information indicating the presence or absence of batch update data corresponding to the version is received from the center system (step 1802). Whether or not the batch update data exists is determined (step 1803). If the batch update data does not exist, the processing is terminated. If the batch update data exists, the batch update data is received (step 1804).

According to the eighth embodiment, the center system generates and transmits the batch update data, whereby the map data processing apparatus need not generate the batch update data and the operation is speeded up.

In the described embodiment, the map data version is sent from the map data processing apparatus to the center system and the center system determines the batch update data to be transmitted. However, similar advantages are provided if the map data processing apparatus first determines the version of the differential data held by the center system and then requests the center system to send the corresponding batch update data and receives the batch update data from the center system.

As described above, the map data processing apparatus of the invention includes map data storage unit for storing map data, differential data input unit for inputting differential data representing the difference between the current map data stored in the map data storage unit and the most recent map data in a script format for each version, and map data multiple update unit for updating the map data in the map data storage unit to the most recent map data using the differential data corresponding to the version, so that it is made possible to update the map data to the most recent map with small-capacity memory if the version of the map data proceeds.

The map data processing apparatus of the invention includes map data storage unit for storing map data, communication unit for transmitting the version of the map data stored in the map data storage unit to an external system and receiving the corresponding differential data represented in a script format based on the version information, and map data multiple update unit for updating the map data in the map data storage unit to the most recent map data using the differential data, so that it is made possible to update the version of the map data to the most recent map data version without increasing the differential data amount required for update.

The center system of the invention includes communication unit for communicating with a map data processing apparatus, differential data storage unit for storing differential data represented in a script format for each version, and transmission data determination unit for determining the differential data to be transmitted from the differential data storage unit to the map data processing apparatus based on version information received through the communication unit from the map data processing apparatus, wherein the differential data determined by the transmission data determination unit is transmitted to the map data processing apparatus through the communication unit. Thus, if the version of the map data proceeds, the differential data amount required for update does not increase.

What is claimed is:

1. A map data processing apparatus comprising:
   a map data storage unit configured to store map data;
   a differential data input unit configured to input differential data representing the difference between current map data stored in the map data storage unit and the most recent map data in a script format for each version;
   a map data multiple update unit configured to update the map data in the map data storage unit to the most recent map data using the differential data corresponding to the version;
   wherein the map data multiple update unit includes a batch update data generation unit configured to generate batch update data from a plurality of pieces of differential data, where each differential data corresponds to a different version.

2. The map data processing apparatus as claimed in claim 1, wherein the map data is made up of a plurality of elements.

3. The map data processing apparatus as claimed in claim 1,
   the map data multiple update unit uses the generated batch update data to update the map data.

4. The map data processing apparatus as claimed in claim 1, wherein the map data multiple update unit updates a plurality of pieces of differential data in order from the differential data in an earlier version to the differential data in a later version.

5. The map data processing apparatus as claimed in claim 1, further comprising: a map data storing unit configured to store already updated map data;
   wherein the already updated map data is additionally stored in the map data storing unit.

6. The map data processing apparatus as claimed in claim 1, further comprising: a map data storing unit configured to store already updated map data;
   wherein the data stored in the map data storing unit is overwritten with the updated map data.

7. A map data processing apparatus, comprising:
   a map data storage unit configured to store map data;
   a communication unit configured to transmit the version of the map data stored in the map data storage unit to an external system and to receive the corresponding differential data represented in a script format based on the version information;
   a map data multiple update unit configured to update the map data in the map data storage unit to the most recent map data using the differential data;
   wherein the map data multiple update unit includes a batch update data generation unit configured to generate batch update data from a plurality of pieces of differential data, where each differential data corresponds to a different version.

8. A center system, comprising:
   a communication unit configured to communicate with a map data processing apparatus;
   a differential data storage unit configured to store differential data represented in a script format for each version;
   a transmission data determination unit configured to determine the differential data to be transmitted from the differential data storage unit to the map data processing apparatus based on version information received through the communication unit from the map data processing apparatus;
   a batch update data generation unit configured to generate batch update data from a plurality of differential data, each differential data corresponding to different version information; and
   wherein the differential data determined by the transmission data determination unit and/or batch data determined by batch update data generation unit are transmitted to the map data processing apparatus through the communication unit.

* * * * *